United States Patent
Scharmach et al.

(10) Patent No.: US 10,472,935 B2
(45) Date of Patent: Nov. 12, 2019

(54) METHOD OF CONTROLLING STATIC PRESSURE IN THE RESERVOIR OF A LIQUEFIED GAS AND PROPPANT BLENDER

(71) Applicants: William J. Scharmach, Grand Island, NY (US); Gregory Panuccio, Amherst, NY (US)

(72) Inventors: William J. Scharmach, Grand Island, NY (US); Gregory Panuccio, Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 428 days.

(21) Appl. No.: 14/921,636

(22) Filed: Oct. 23, 2015

(65) Prior Publication Data
US 2017/0114614 A1  Apr. 27, 2017

(51) Int. Cl.
| | | |
|---|---|---|
| *E21B 41/00* | (2006.01) | |
| *E21B 43/26* | (2006.01) | |
| *E21B 43/267* | (2006.01) | |
| *G05B 19/416* | (2006.01) | |
| *E21B 21/06* | (2006.01) | |

(52) U.S. Cl.
CPC ........ *E21B 41/0092* (2013.01); *E21B 21/062* (2013.01); *E21B 43/26* (2013.01); *E21B 43/267* (2013.01); *G05B 19/416* (2013.01); G05B 2219/37371 (2013.01)

(58) Field of Classification Search
CPC .... E21B 21/062; E21B 41/0092; E21B 43/26; E21B 43/267; G05B 2219/37371; G05B 19/416

See application file for complete search history.

(56) References Cited

U.S. PATENT DOCUMENTS

| | | | | |
|---|---|---|---|---|
| 4,374,545 A | * | 2/1983 | Bullen | B62B 1/18 166/177.5 |
| 5,423,205 A | * | 6/1995 | Farchone | B01F 15/00136 702/137 |
| 2010/0288507 A1 | * | 11/2010 | Duhe | E21B 21/08 166/370 |
| 2014/0174747 A1 | * | 6/2014 | Kelly | E21B 43/267 166/308.2 |
| 2015/0060065 A1 | | 3/2015 | Scharmach et al. | |
| 2016/0168941 A1 | * | 6/2016 | Rodela | E21B 33/068 166/244.1 |
| 2016/0319648 A1 | * | 11/2016 | Hayworth | E21B 43/267 |

* cited by examiner

*Primary Examiner* — Robert E Fuller
*Assistant Examiner* — Christopher J Sebesta
(74) *Attorney, Agent, or Firm* — Iurie A. Schwartz

(57) ABSTRACT

The present invention concerns a feedback control method for adjusting the proppant concentration in a fracturing fluid that is utilized in stimulation of an underground formation.

3 Claims, 2 Drawing Sheets

METHOD OF CONTROLLING STATIC PRESSURE IN THE RESERVOIR OF A LIQUEFIED GAS AND PROPPANT BLENDER

FIELD OF INVENTION

A method and associated apparatus is disclosed for controlling the pressure of a proppant containing reservoir for use in the modification of proppant loading and to be used in the stimulation of underground formations with liquefied gas. The apparatus includes a proppant storage vessel configured to deliver a proppant flow to a fracturing fluid stream, a means of controlling the pressure inside the proppant reservoir with the use of a pressurized fluid and/or vent, and devices for measuring the flow and proppant loading of the fracturing fluid. During operation, modifications in proppant reservoir pressure are used to control the flow of material from the reservoir. The fracturing fluid flow rate and proppant concentration is used to optimize the response of a feedback control loop for controlling the pressure in the proppant vessel.

BACKGROUND

Hydraulic fracturing is a widely used technique to stimulate the production of petroleum and natural gas from subterranean formations. After a wellbore is drilled into the reservoir rock, fracturing fluid, generally water containing suspended proppant, is injected in a manner to open a fracture into the exposed formation and place proppant within the newly formed fracture to prevent the complete closure of the fracture. This process increases the conductivity of the hydrocarbon-bearing subterranean formation and facilitates the production of previously trapped oil and gas from reservoirs and into the wellbore.

Liquefied gas fracturing (with fluids like $CO_2$) can be used to alleviate many of the associated problems with water-based fracturing such as reduced permeability due water trapping, swelling and migration of water-sensitive clays, and reduced or eliminated surface fluid spills. However, there are limitations in commercial application. For $CO_2$, equipment must be operated at elevated pressures above the triple point of carbon dioxide (i.e., greater than 75.1 psia) in order to maintain a liquid and pumpable state. Equipment is available for fracture treatments to mix proppant directly with liquid carbon dioxide based fracturing fluids. This equipment generally consists of a pressurized vessel and manifold system that blends the proppant into a liquid $CO_2$ stream prior to the high-pressure pumps. Proppant is loaded into the $CO_2$ blender where the unit is sealed and then filled with $CO_2$. During the fracturing process, proppant is drawn into the fracturing fluid by either augers or gravity fed through a control valve.

Earlier efforts, as described in U.S. Pat. No. 4,374,545, provide for a batch process creating a proppant and $LCO_2$ fracturing slurry. Each unit is capable of metering up to 20 tons of a single type of proppant and addresses the control of proppant supply through the use of a metering auger. $LCO_2$ additions made to the tank allow for a flowable and vapor-free proppant slurry leaving the system as well as maintaining pressure in the vessel to prevent misdirected flow of $CO_2$ from the main fracturing fluid stream back into the proppant supply.

The U.S. Published Patent Application U.S. 2015/0060065 A1 describes a control system, associated methodology, and apparatus for implementation of an eductor-mixer technique to provide the capability to inject and meter proppant material into a non-aqueous fracturing fluid stream. The system utilizes a solids-conveying liquid eductor instead of a conventional auger to mix and accelerate proppant within the main fracturing liquid stream. The control system utilizes at least one valve for controlling the flow of proppant from one or more pressurized proppant reservoir into the eductor; thereby mixing the material with the motive stream. Gas and/or liquid is fed to the top of the proppant reservoir to control the pressure inside the proppant reservoir. Modifying the pressure inside the proppant reservoir extends the range of achievable proppant flow rates from the reservoir into the eductor.

Since the use of reservoir pressure (with solids-handling valving) is used to manipulate the ultimate flow rate of material from the proppant reservoir, it is pertinent to determine the effect of pressure on the resulting proppant concentration. This would be difficult to achieve without the use of complex modeling and complete characterization of equipment at various treatment rates and proppant concentrations. If a densitometer is used to correct pressure values inside the proppant reservoir, hysteresis or time-delay in concentration readings can create the possibility of overshooting desired loadings. Equipment can be set up to incrementally adjust reservoir pressure to reduce the likelihood of overshooting concentration values, but at the cost of increasing the response time. To overcome the disadvantages of the related art, it is an object of the present invention to provide a method for adjusting static pressure inside the proppant reservoir for the purpose of providing timely changes in proppant concentration in the fracturing fluid, while reducing the probability of overshooting desired proppant concentration values. Specifically, the control mechanism developed utilizes a flow meter located on the main fracturing fluid stream (on either the clean or proppant containing side) and proppant loading sensor to guide static pressure changes in the proppant reservoir.

Other objects and aspects of the present invention will become apparent to one skilled in the art upon review of the specification, drawings and claims appended hereto.

SUMMARY OF THE INVENTION

The present invention describes a method and associated system for modifying the pressure in a proppant reservoir and thereby improving the regulation of proppant into a fracturing fluid stream. More specifically, this system employs the use of a proppant reservoir, flow meter (or other device capable of determining the rate of flow), densitometer, and a pressure source to provide the proper concentration of proppant in a flowing stream of fracturing fluid for use in stimulating new and existing oil and gas wells. The vessel is sealed from the atmosphere in order to achieve proper pressure modification and is in communication with the main treatment fluid. As an example, the operating pressure for the proppant mixing system, including the proppant reservoir and supplementary piping and equipment, is around 200 to 400 PSI.

Pressurized gas and/or liquid is fed to the head space of the proppant reservoir to control the pressure inside the proppant reservoir. The system employs the use of a flow meter to measure the treatment fluid flow rate (located on either the clean or slurry side) and a densitometer to measure the concentration of proppant in the treatment fluid. The flow meter and densitometer output electronic signals that are directly related to the volume and solids concentration passing through the meter. The signals are sent to a processor and using a predetermined algorithm, the measured flow rate and concentration are converted into a pressure gradient to be displayed to the operator or to guide output signals from the processor to pressure control valves used to regulate the pressure inside proppant reservoir.

A pressure control valve is used to regulate the flow of pressurized fluid into the proppant reservoir and another valve is used to relieve pressure from the proppant reservoir. A pressure sensor is positioned in such a way to sense the pressure of the proppant reservoir at either the top or bottom of the reservoir. The processor is connected to receive an output signal from the pressure sensor. The processor is further connected to output a control signal to both pressure control valves to regulate the flow of pressure control fluid into or out of the proppant reservoir.

The apparatus may also comprise a non-mechanical pump, such as a solids-conveying liquid eductor is used to mix and accelerate proppant within the main treatment fluid stream and is located beneath the proppant reservoir. A solids-handling control valve may be disposed between the proppant reservoir and the main treatment fluid piping or solids-conveying eductor. The control valve is used for controlling the flow of proppant from the pressurized proppant reservoir into the eductor or main treatment fluid stream.

In an exemplary embodiment of the invention, a feedback control method for adjusting the proppant concentration in a fracturing fluid that is utilized in stimulation of an underground formation is provided. The control method includes supplying proppant or proppant slurry from a sealed, pressurized proppant reservoir to a fracturing fluid stream; supplying a fluid flow of liquefied gas and measuring the flow rate of said fluid by a flow meter, and providing a feedback signal to a computer; combining the proppant or proppant slurry with the liquefied gas stream forming a fracturing fluid containing proppant and measuring a concentration of the proppant in said fracturing fluid downstream by a concentration meter, and providing a feedback signal to a computer; changing the concentration of the fracturing fluid by sending a signal from the computer to route a pressurized fluid to the proppant reservoir thereby manipulating the pressure in said proppant reservoir to attain the desired concentration; supplying a pressure control system for regulating the flow of the pressurized fluid to the proppant reservoir comprising a flow regulating device and feedback pressure sensor in communication with the fluid in the proppant reservoir; and programming an algorithm for adjusting the tuning parameters of the pressure control system through conditions measured by the concentration meter and the flow meter.

BRIEF DESCRIPTION OF THE DRAWINGS

The above and other aspects, features, and advantages of the present invention will be more apparent from the following drawings, wherein.

DETAILED DESCRIPTION OF THE INVENTION

The present invention involves an apparatus for providing a continuous or semi-continuous supply of fracturing liquid, where the flow rate and method of controlling the flow rate utilizes changes in proppant reservoir pressure. As employed herein, "fracturing fluid", "fracturing liquid", or "treatment fluid" are used interchangeably, and refers to the product routed downstream to the fracturing pump. Fluid containing no proppant, is upstream of blending equipment or proppant injection points may be referred as "clean or motive fluid". Piping system used to carry both the "clean fluid" and "treatment fluid" may be referred to as the "main fluid line".

Figure 1:
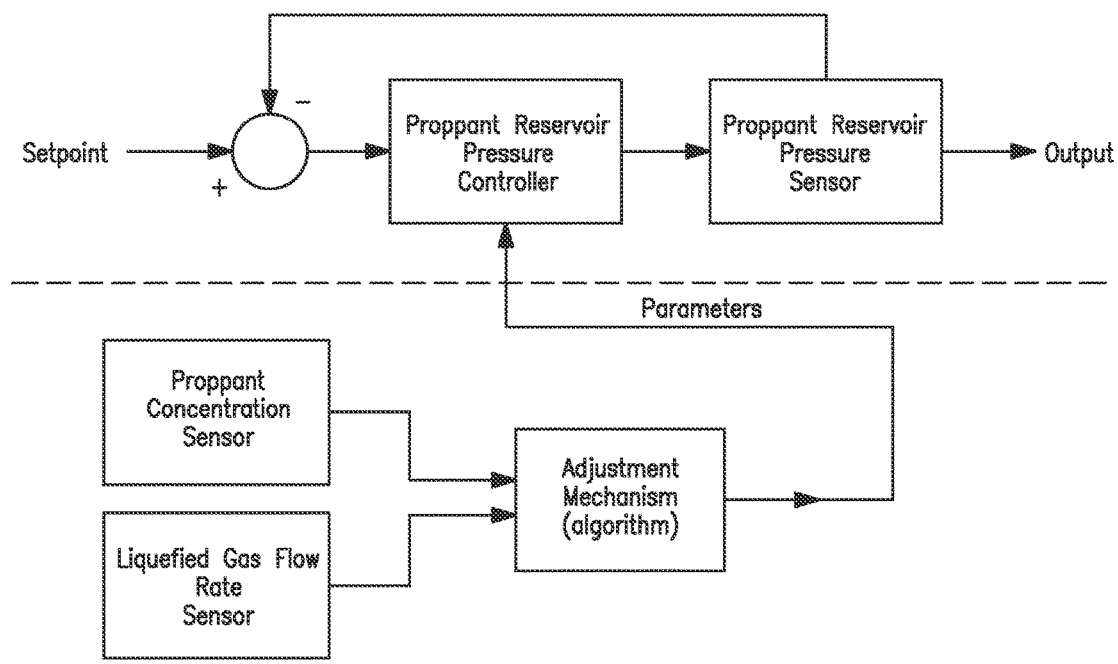
FIG. 1 is a block diagram of an adaptive control loop using proppant concentration and flow rate to adjust the tuning parameters of the loop.

FIG. 1 is a schematic of PID feedback control system used in the modification of pressure in a proppant reservoir. The PID controller performs a PID computation of the control difference between the setpoint value and the pressure sensed by the proppant reservoir pressure sensor. The PID computation results in a control signal or output sent to a pressure control valve or other controllable object used in the manipulation of reservoir pressure. The adjustment mechanism is used as a PID loop parameter modifier and changes the controller response based on signals sent from a proppant loading sensor and flow rate sensor located on the main fluid line.

In its simplest form, the scheme can be looked at as an open-loop adaptive control system, wherein the response to the modifications of the control parameters are not measured and feedback is not given on the efficacy of the parameter change. In this case, the type of adjustment mechanism could be as simple as a look-up table stored in a computer which gives the controller parameters for a given set of environment conditions. Less rigid relationships could be provided with the use of model equations to provide a more dynamic system.

An example of such a system in use would be as follows: Signals from the "Liquefied Gas Flow Rate Sensor" and the "Proppant Concentration Sensor" are measured and sent to a computer. The computer will then "look-up" or calculate the tuning parameters for the controller based on the flow rate and proppant concentration measured. For instance, the ideal version of a PID controller is given by the formula:

$$u(t) = K_P * e(t) + K_I * \int_0^t e(\tau)d\tau + K_D * \frac{de}{dt} \qquad \text{Equation 1}$$

where u is the control signal and e is the control error (e=r−y). r is the reference or setpoint value. The control signal is the sum terms of a proportional term (proportional to the error), an integral term (proportional to the integral of the error), and a derivative term (proportional to the derivative of the error). The controller tuning parameters in this case are the proportional ($K_p$), integral ($K_I$) and derivative ($K_D$) gain. The controller tuning parameters could then be defined as variables dependent on the liquefied gas flow rate and the proppant concentration. An example of equations for determining the tuning parameters are as follows:

$$K_P = f(GFR,PC) = C_1*GFR + C_2*PC + C_3 \qquad \text{Equation 2}$$

$$K_I = f(GFR,PC) = C_4*GFR + C_5*PC + C_6 \qquad \text{Equation 3}$$

$$K_D = f(GFR,PC) = C_7*GFR + C_8*PC + C_9 \qquad \text{Equation 4}$$

where GFR is the liquefied gas flow rate, PC is the proppant concentration, and $C_{1-9}$ denotes predetermined constants. These constants can be determined in several ways, but most commonly through equipment testing at multiple gas flow rate and proppant concentration conditions.

Figure 2:
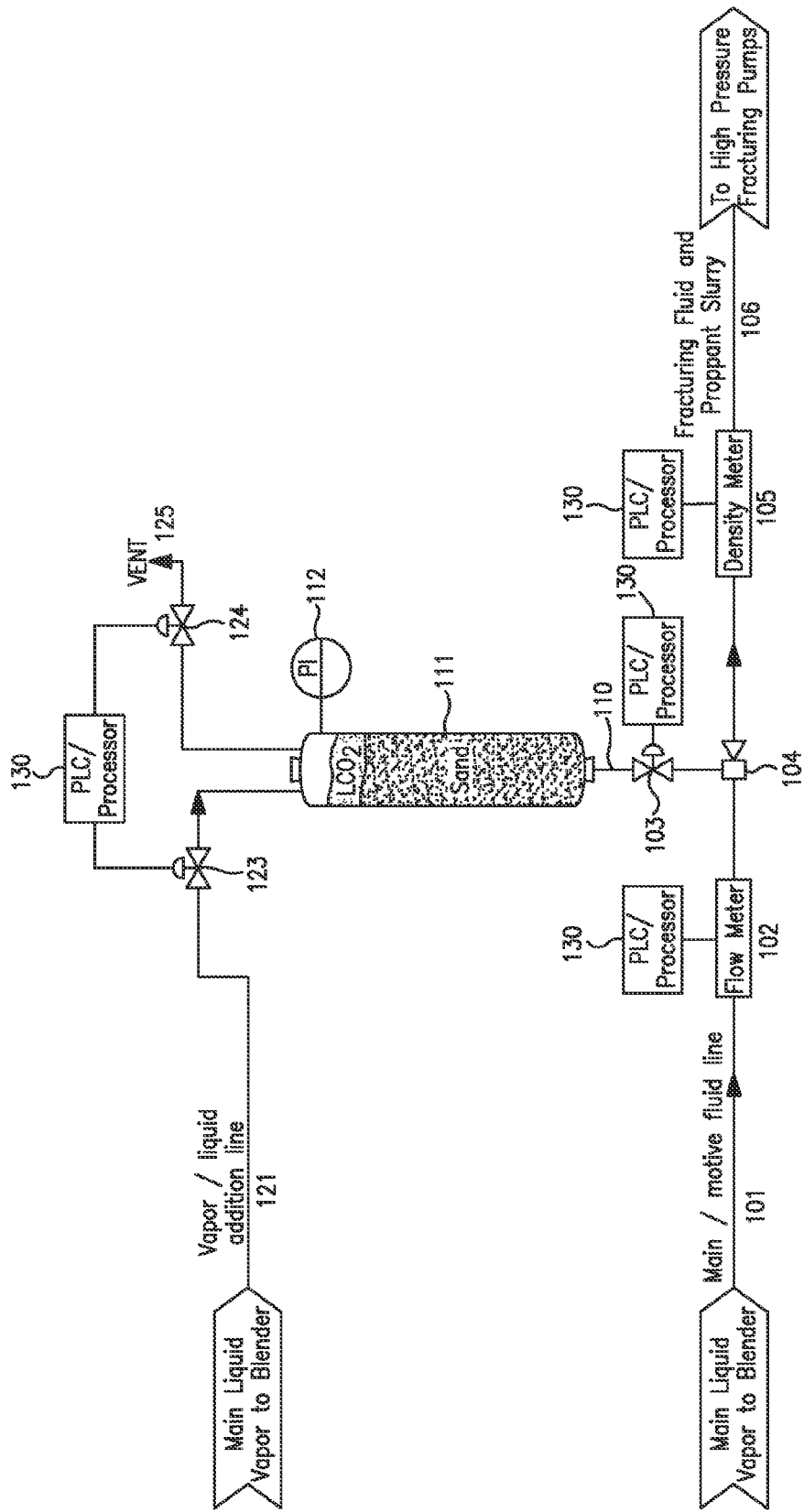
FIG. 2 is a schematic depiction of an embodiment of the equipment with the inclusion of a non-mechanical pump and a control valve(s) disposed between the proppant reservoir and main treatment fluid piping. The equipment is arranged in a way for managing the rate of pressure change in the proppant reservoir during proppant injection.

FIG. 2 shows a proppant addition apparatus similarly described by the document U.S. Published Patent Application U.S. 2015/0060065 A1. Motive fluid or clean fluid stream enter the system through upstream piping 101 and passes through an eductor 104. As liquids pass through the converging nozzle of the eductor, potential energy is converted into kinetic energy resulting in a high velocity jet flow. This change in energy results in a localized decrease in static pressure that creates suction within the body of the eductor. This suction allows material from the reservoir 111 to be drawn into the eductor and entrained by the fluid ($LCO_2$, etc.). The eductor serves a dual purpose: mixing within the nozzle as well as drawing material into the fluid to ensure intimate mixing. The combined clean fluid and material is then sent to high pressure pumpers via the upstream piping 106. The rate of flow of material entering the outlet of the reservoir 110 is controlled by use of a combined control valve 103 and reservoir pressure. The pressure in the reservoir is sensed by pressure indicator 112. The pressure is controlled through the use of a pressurized fluid 121 regulated by control valve 123 and vent 125 regulated by control valve 124. A processor 130 is used to output the control signal to said control valves 103, 123, 124. The processor 130 is typically a single unit, shown in the figure at several locations to simplify the illustration. A densitometer 105, whose signal is used as input for the processor 130, is a feedback device for controlling the positioning of flow control valve 103.

The present invention adds an added complexity with flow meter 102 measuring clean fluid flowrate. Alternatively a flow meter located downstream of the eductor 104 measuring the combined flow of proppant and clean fluid or fracturing fluid may be used. However, this is this may contribute to excessive wear of the flow measurement device or possible clogging of fracturing fluid piping 106. The flow meter 102 is used as an input for the processor 130. Using an algorithm based on clean fluid flow rate and proppant concentration measured by densitometer 105, a rate of position change or PID tuning parameters for pressurized fluid control valve 123 and vent control valve 124 is determined and is then used to guide speed in which the valves 123, 124 open and close.

What is claimed is:

1. A method for dynamically adjusting a feedback control for proportional-integral-derivative (PID) control loops tuning gains in a fracturing fluid that is utilized in stimulation of an underground formation, wherein the loop output regulates the head pressure in a proppant reservoir comprising:

supplying proppant or proppant slurry from a sealed, pressurized proppant reservoir to a fracturing fluid stream;

supplying a fluid flow of liquefied gas and measuring the flow rate of said fluid by a flow meter, and providing a feedback signal to a computer;

combining the proppant or proppant slurry with the liquefied gas stream forming a fracturing fluid containing proppant and measuring a concentration of the proppant in said fracturing fluid downstream by a concentration meter, and providing a feedback signal to the computer; and adjusting a PID controller for adjusting proportional, integral, and derivative gains of the PID control loops based on the feedback signals of flow and concentration to the computer, wherein the PID controller is given the following formula:

$$u(t) = K_P * e(t) + K_I * \int_0^t e(\tau)d\tau + K_D * \frac{de}{dt} \qquad \text{Equation 1}$$

where u is the control signal and e is the control error and is the reference of the set point, and where the tuning parameters are based on the following:

$K_P = f(\text{GFR},\text{PC}) = C_1*\text{GFR} + C_2*\text{PC} + C_3$      Equation 2

$K_I = f(\text{GFR},\text{PC}) = C_4*\text{GFR} + C_5*\text{PC} + C_6$      Equation 3

$K_D = f(\text{GFR},\text{PC}) = C_7*\text{GFR} + C_8*\text{PC} + C_9$      Equation 4 where GFR is the liquefied gas flow rate, PC is the proppant concentration, and $C_{1\_9}$ denotes predetermined constants.

2. The feedback control method of claim 1, further comprising a method of measuring the rate of flow of proppant or proppant slurry from the proppant reservoir and programming an algorithm in said computer for adjusting gains of the PID control loops based on the flow rate from the proppant reservoir.

3. The feedback control method of claim 1, wherein the PID controller is a dynamic PID controller having an algorithm integrated therein.

* * * * *